Figure 4:
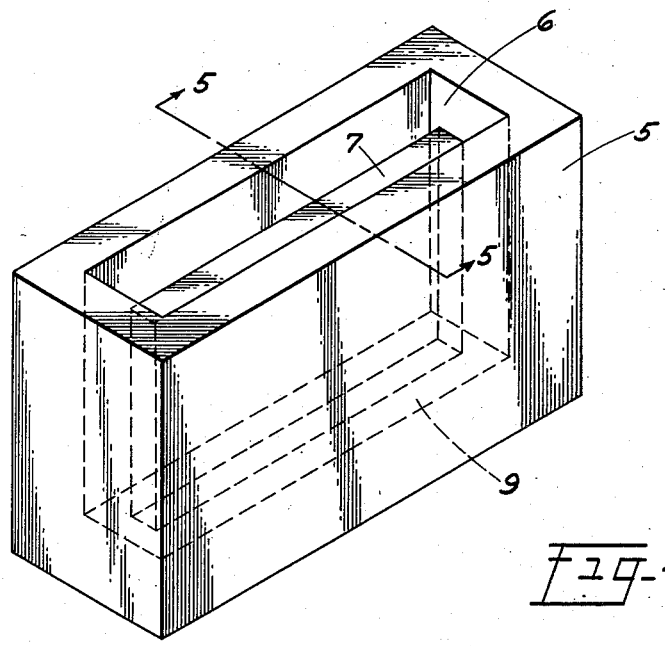

Aug. 6, 1957 — W. E. LEYSHON — 2,802,108
METHOD AND APPARATUS FOR COLLECTING ISOTOPES
Filed July 18, 1950 — 2 Sheets-Sheet 1
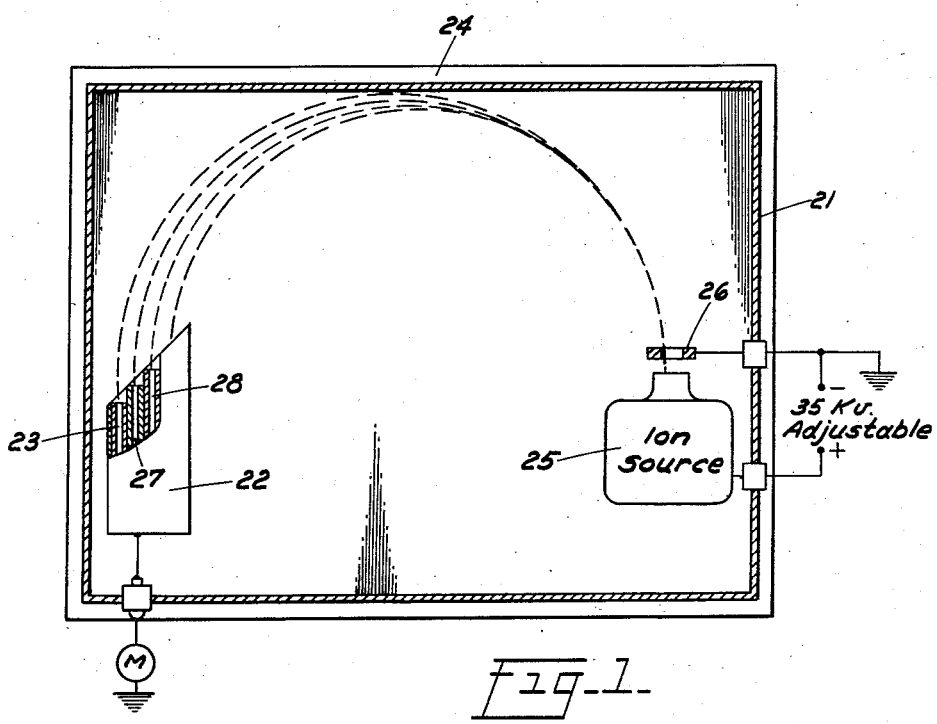
Fig-1-
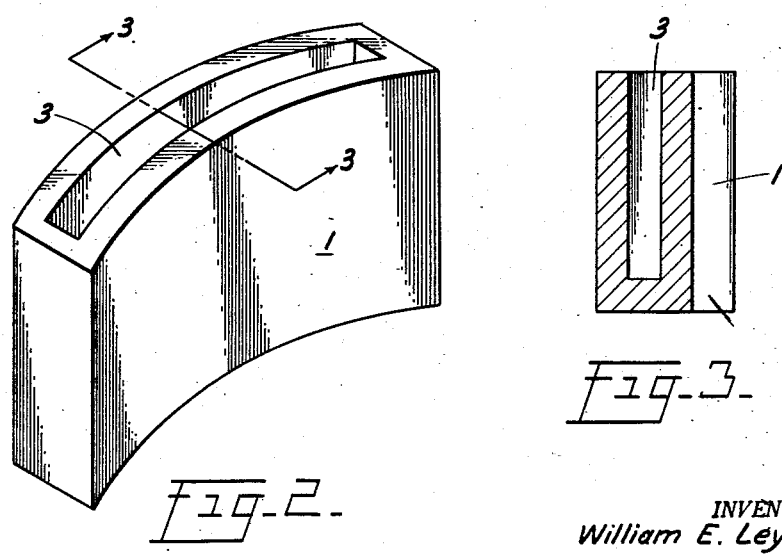
Fig-2-
Fig-3-
INVENTOR.
William E. Leyshon
BY
Roland A. Anderson
ATTORNEY INVENTOR.
William E. Leyshon
BY
Roland A. Anderson
ATTORNEY

United States Patent Office

2,802,108
Patented Aug. 6, 1957

2,802,108

METHOD AND APPARATUS FOR COLLECTING ISOTOPES

William E. Leyshon, Oak Ridge, Tenn., assignor to the United States of America as represented by the United States Atomic Energy Commission Application July 18, 1950, Serial No. 174,561

10 Claims. (Cl. 250—41.9)

My invention relates to electromagnetically operated equipment for the separation of isotopes, and more particularly to a system and receiver for the collection and retention of isotopes of high vapor pressure such as mercury.

The large scale separation of ions by means of the electromagnetically operated apparatus known in the art as the calutron is accomplished by forming a gaseous or vaporizable compound of the element to be separated, ionizing the gas or vapor, subjecting the ions to an accelerating potential and to a magnetic field, causing them to travel in arcuate paths of radii corresponding to their masses, and then collecting the isotopes in receivers located at or near the focal points of the ion beams. The pockets of these receivers are ordinarily made of graphite or copper and are maintained at an appropriate potential for discharging the ions. Separate pockets in the receivers serve to collect different isotopes. After a quantity of material has been collected, the receivers are removed and the desired isotopes are recovered. In the case of uranium collected in carbon pockets, the carbon is broken into pieces or burned in a carbon burner after which the ashes are leached or otherwise treated to recover the uranium. One suitable apparatus for carrying out this recovery operation is disclosed in the prior co-pending application of Sullivan et al., for a Carbon Burner, Serial No. 75,066, filed February 7, 1949.

In these arrangements of the prior art graphite was suitably employed as the material for the pockets where the elements to be collected were inherently low vapor pressure elements. However, since graphite is a relatively poor heat conductor and tends to build up and retain heat, it would have the effect of vaporizing the material collected, causing it to escape. Copper, on the other hand, was usually employed where the material to be collected was of high vapor pressure or low melting point, such as barium. Copper is a good heat conductor and can be made water-tight, so water may be circulated through the walls of the pockets to maintain a low temperature and prevent the escape of the collected materials or isotopes.

Where the above materials are used for the receivers, the uranium or other element or isotope adheres to the receiver and does not have sufficient vapor pressure to leave it. Adhesive forces between the graphite or copper and the atoms or particles of collected material are greater than the vapor pressure forces that would cause the particles to depart from the surface. The phenomena may be likened to the collection of dust particles on a windshield or glass where they tend to stick to it. Thus the collection of such elements is purely a physical, as distinguished from a chemical action.

However, when it is attempted to collect the isotopes of high vapor pressure elements such as mercury, it has been found that the ions upon reaching the receiver and being discharged into particles of the element have such high vapor pressure that the adhesive forces between the receiver and the collected material are insufficient to retain them, so that such collected materials become vaporized and escape from the receiver.

Applicant with a knowledge of these problems in the prior art has for an object of his invention the provision of a receiver having pockets, in an electromagnetically operated system for the separation of isotopes, to collect and retain isotopes of such high vapor pressure elements as mercury.

Applicant has as a further object of his invention the provision of a receiver for an electromagnetically operated system for the separation of isotopes having pockets of such a material that in the collection of isotopes of such elements as mercury the particles of such substances upon striking a pocket of the receiver form an amalgam and are retained in solution.

Applicant has as a still further object of his invention the provision of a pocket for a receiver, in an electromagnetically operated system for the separation of isotopes, of a metal which forms an amalgam with the particles of the isotopes collected, and permits the subsequent separation of the collected materials by distillation.

Other objects and advantages of my invention will appear from the following specification and accompanying drawings, and the novel features will be particularly pointed out in the annexed claims.

Figure 5:
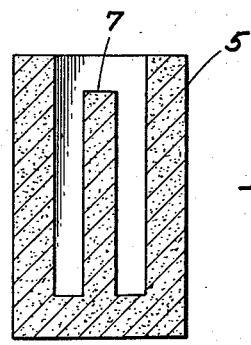

In the drawings, Fig. 1 is a schematic, partly in section, of a conventional electromagnetically operated system for the separation of isotopes incorporating my improved pockets in a receiver. Fig. 2 is a perspective of my improved pocket. Fig. 3 is a cross sectional view of my improved pocket taken along the line 3—3 of Fig. 2. Fig. 4 is a perspective of a suitable form of mold for forming my improved pocket. Fig. 5 is a cross sectional view of the same mold taken along the line 5—5 of Fig. 4.

While my invention may be used in various forms of calutrons such as disclosed in the co-pending applications of Barnes, Serial No. 658,946, filed April 2, 1946, and Carter, Serial No. 706,821, filed October 31, 1946, one suitable form of calutron, shown in Fig. 1 of the drawings, comprises the combination of an evacuated closed vessel 21 having a magnetic field passing therethrough in the plane of the paper, provided by a magnet, one pole of which is indicated at 24. The magnet is of such strength as to constrain uniform velocity ions projected within the vessel to arcs whose radii are a predetermined fixed function of the momentum of the ions. By such means it is known that ions having a common origin and traveling different paths of equal curvature, will, due to geometrical focusing action, substantially pass through a common region after 180° of travel.

In order for this apparatus to have practical utility as a means for making isotopes available in quantity, it is necessary to provide a receiver 22, which is an assembly, holding in alignment the individual pockets, one pocket for each isotope, in order to collect separately the ions differing in mass, that is, the different isotopes, so that they may be recovered to provide materials having greater proportions of the desired isotopes than occur in nature. In this arrangement, applicant has replaced the conventional receiver with receiver 22 having a plurality of pockets 23, 27, and 28, held in the receiver in the conventional way, for the reception of the desired isotopes of mercury or other high vapor pressure substances. While only three pockets have actually been shown, it is clear that almost any selected number corresponding to the isotopes which it is desired to collect may be provided.

Within the vessel 21, which is preferably highly evacuated, there is provided a source 25 where ionization of neutral vapors containing the desired isotopes takes place and which furnishes the ions of such desired materials, having the isotopes to be separated, as heretofore indicated. The accelerating electrode 26 above the source is made negative with respect to the ion source and serves to project the ions into the space within the vessel 21 so that they travel at high speeds in their arcuate paths towards the receiver 22.

While graphite or copper receivers are customarily employed in the above system, their generally unsatisfactory performance in collecting high vapor pressure isotopes, such as mercury, led to the discovery that with a receiver of such material as silver, particles of mercury would hit the surface or walls of the pockets of the receiver to form an amalgam therewith. Amalgams behave according to the laws of solutions. These particles hitting the surface and forming the amalgam or solution, penetrate into the body of the pocket. Therefore, later arriving ions will not serve to knock off some of the particles from the surface as would be the case if the solution were not formed. This is particularly important, as mere surface collections would be less efficient, since some of these particles would be knocked off by the incoming ions. While sheet copper, plated or coated with silver, might be employed as the material of the receiver, this is generally unsatisfactory since the plated layer is subject to errosion and is not sufficiently deep to permit penetration.

While silver is the preferred material for use in the receiver it follows that gold would likewise form an amalgam with mercury and might be used except for considerations of cost. Cadmium is known to form an amalgam under calutron conditions, but the melting point of this element is so low that it would be very difficult and expensive to distill out the mercury therefrom once it had been collected. It would necessitate a complicated distillation process of several steps to effect the separation. However, satisfactory separation could be effected by dissolution and selective precipitation using conventional methods.

Referring to the receiver of Fig. 2, the body portion 1 of each pocket is preferably first cast to substantially rectangular configuration with straight walls. Then the body 1 is bent to curved configuration. This is accomplished by placing the body against a forming tool and then applying force to the ends of the body to wrap it about the forming tool, thereby causing it to assume the shape thereof. While these pockets may be reasonably deep, the walls defining them are of substantial thickness, as indicated in Fig. 3. Although the preferred shape of the body portion 1 is curved, this results from the particular magnetic shimming used in the system where it was employed, and is not to be considered as a limitation on the invention, for any other suitable form or shape of the pocket may be utilized so long as it meets the requirements of the system in which it is to be used.

Any conventional means for mounting the receiver in the calutron unit may be employed. In addition, the outside surfaces of the pockets of the receiver must be painted or coated with a varnish like substance which is low in vapor pressure and not permeable to mercury vapor, such as "Glyptal," to avoid contamination by preventing them from picking up or collecting tank vapors including unseparated mercury or other charge material.

The receiver shown with the three pockets 23, 27 and 28 may have any desired number as heretofore indicated. The pockets may be formed in any suitable type of mold, since fabrication from bar stock would not be practicable in view of the high cost of fabricating the silver and the inventory requirements which would be necessitated by such construction. One form of mold particularly applicable to the present purpose is shown in Figs. 4 and 5. This is a one piece graphite mold with body 5 having a cavity 6. Projecting upwardly from the bottom of the cavity in spaced relation to the walls thereof is a tongue 7. The bottom wall 9 of the cavity lies in a single plane to define the inner face of the pocket, and the tongue 7 serves to form the cavity 3 in the pocket. The pockets are cast by pouring the melted silver into the mold, and permitting it to cool. After it solidifies the mold, the pocket is removed from the mold. If desired, water cooling or circulation channels or bores may be formed in the walls of the pocket for the circulation of water or coolant to control the temperature of such pocket.

Having thus described my invention, I claim:

1. A method of separating the isotopes of high vapor pressure substances comprising the steps of ionizing neutral vapors of mercury containing the desired isotopes, accelerating the ions into a magnetic field to cause them to travel in arcuate paths whose radii correspond to their respective masses, and then causing the ions to strike pockets of an amalgam forming metal for collecting and retaining them.

2. A method of separating the isotopes of high vapor pressure substances comprising the steps of ionizing vapors of mercury containing the desired isotopes, accelerating the ions at high velocities into space, subjecting the ions to the actions of a magnetic field to separate them into beams and cause them to travel in arcuate paths with radii corresponding to their respective masses, and then causing the beams to strike collectors of a solid solution forming metal to retain them.

3. A method of separating and recovering the isotopes of high vapor pressure substances comprising the steps of ionizing vapors of mercury containing the desired isotopes to be recovered, accelerating the ions, separating the ions into groups corresponding to their respective masses, causing the groups of ions to strike separate collectors of an amalgam forming metal for retaining them, and then selectively removing the desired isotopes from said collectors.

4. A method of separating the isotopes of high vapor pressure substances comprising the steps of ionizing vapors of mercury containing the desired isotopes, accelerating the resulting ions through a magnetic field to separate them into beams and cause them to travel in arcuate paths whose radii correspond to their respective masses, and then causing said beams to strike collectors of silver to form an amalgam and retain the isotopes.

5. A method of separating and recovering isotopes of high vapor pressure substances comprising the steps of ionizing vapors of mercury containing the desired isotopes to be recovered, accelerating the ions, separating the ions into groups corresponding to their masses along their paths of travel, causing the groups of ions to strike separate collectors of silver to form an amalgam for retaining them, and then selectively removing the isotopes from the collectors.

6. A system for separating and collecting isotopes of high vapor pressure substances comprising a source of ions containing the desired isotopes to be recovered, means for accelerating said ions into a magnetic field to cause them to form beams and travel in arcuate paths having radii corresponding to their respective masses, and a receiver positioned at the focal points of said beams for collecting and retaining the isotopes, said receiver including a series of pockets of a solid solution forming metal for contact with the ions to retain them against removal.

7. A system for separating and collecting isotopes of mercury comprising a source of mercury ions containing the desired isotopes to be collected, means for accelerating the ions into a magnetic field for separating the ions into beams corresponding to their respective masses, and a solid pocket of amalgam forming material positioned in the path of one of said ion beams for contact with the ions thereof to form an amalgam and retain them.

8. A system for separating and collecting isotopes of mercury comprising a source of mercury ions containing the desired isotopes to be collected, means for accelerating the ions into a magnetic field for causing them to travel in arcuate paths whose radii correspond to their respective masses and produce beams, a plurality of pockets of silver positioned at the focal points of said beams for contact with the ions of said beams to produce an amalgam and retain them in the pockets.

9. A pocket for collecting the isotopes of a high vapor pressure substance comprising an elongated substantially rectangular body portion of solid solution forming metal for seating in a receiver, said body portion being curved longitudinally to arcuate configurations, and means formed in one side edge of said pocket for reception of ions of the substance to be collected to form a solid solution and retain them therein.

10. A pocket for collecting the isotopes of mercury comprising an elongated substantially rectangular shaped body portion of silver material for seating in a receiver, said body portion being curved longitudinally to provide arcuate shaped side edges, and a cavity formed in one of said side edges for the reception of ions of mercury to produce an amalgam and retain them therein.

No references cited.